United States Patent
Ehlgen et al.

(10) Patent No.: US 9,637,046 B2
(45) Date of Patent: *May 2, 2017

(54) METHOD AND CONTROL DEVICE FOR SWITCHING ON THE HIGH BEAM HEADLIGHTS OF A VEHICLE

(75) Inventors: Tobias Ehlgen, Ravensburg (DE); Johannes Foltin, Ditzingen (DE); Robert Meisner, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1 day.

This patent is subject to a terminal disclaimer.

(21) Appl. No.: 14/007,369

(22) PCT Filed: Mar. 22, 2012

(86) PCT No.: PCT/EP2012/055060
§ 371 (c)(1),
(2), (4) Date: Sep. 25, 2013

(87) PCT Pub. No.: WO2012/130707
PCT Pub. Date: Oct. 4, 2012

(65) Prior Publication Data
US 2014/0015411 A1     Jan. 16, 2014

(30) Foreign Application Priority Data
Mar. 31, 2011   (DE) ........................ 10 2011 006 550

(51) Int. Cl.
*B60Q 1/08* (2006.01)
*B60Q 1/14* (2006.01)

(52) U.S. Cl.
CPC .............. *B60Q 1/08* (2013.01); *B60Q 1/143* (2013.01); *B60Q 2300/112* (2013.01);
(Continued)

(58) Field of Classification Search
CPC ............ B60Q 2300/42; B60Q 2300/41; B60Q 2300/112; B60Q 1/1423
See application file for complete search history.

(56) References Cited

U.S. PATENT DOCUMENTS 8,157,427 B2 *  4/2012  Mochizuki ............. B60Q 1/143
                                                    315/82
8,729,803 B2 *  5/2014  Yamazaki .............. B60Q 1/143
                                                    315/77
(Continued)

FOREIGN PATENT DOCUMENTS

CN      101099155 A      1/2008
DE      101 16 490       10/2002
(Continued)

OTHER PUBLICATIONS

International Search Report for PCT/EP2012/055060, dated Jun. 25, 2012.

*Primary Examiner* — Alexander H Taningco
(74) *Attorney, Agent, or Firm* — Gerard Messina

(57) ABSTRACT

A method for switching on a high-beam headlight of a vehicle includes: a step of receiving high-beam information by way of an interface, the high-beam information indicating a possibility of a glare-free operation of the high-beam headlight; a step of determining a traveled distance of the vehicle in response to receiving the high-beam information, and a step of supplying switch-on information for activating the high-beam headlight if the traveled distance after receiving the high-beam information is greater than a predefined minimum distance.

10 Claims, 5 Drawing Sheets

(52) U.S. Cl.
CPC .. *B60Q 2300/136* (2013.01); *B60Q 2300/305* (2013.01); *B60Q 2300/314* (2013.01); *B60Q 2300/32* (2013.01); *B60Q 2300/41* (2013.01); *B60Q 2300/42* (2013.01)

(56) References Cited

U.S. PATENT DOCUMENTS

| | | | | |
|---|---|---|---|---|
| 8,738,236 | B2* | 5/2014 | Moizard | B60Q 1/12 |
| | | | | 362/466 |
| 8,862,336 | B2* | 10/2014 | Dierks | B60Q 1/143 |
| | | | | 362/466 |
| 9,227,553 | B2* | 1/2016 | Nordbruch | B60Q 1/085 |
| 2004/0143380 | A1* | 7/2004 | Stam et al. | 701/36 |
| 2004/0201483 | A1* | 10/2004 | Stam et al. | 340/600 |

FOREIGN PATENT DOCUMENTS

| | | |
|---|---|---|
| DE | 10 2005 017933 | 10/2006 |
| DE | 10 2009 034 224 | 4/2010 |
| DE | 10 2009 028 344 | 10/2011 |
| JP | 2007112250 | 5/2007 |
| JP | 2011001043 | 1/2011 |
| WO | WO 2011/015625 | 2/2011 |

* cited by examiner

METHOD AND CONTROL DEVICE FOR SWITCHING ON THE HIGH BEAM HEADLIGHTS OF A VEHICLE

BACKGROUND OF THE INVENTION

1. Field of the Invention

The present invention relates to a method for switching on a high beam headlight of a vehicle, to a control device for switching on a high beam headlight of a vehicle, and to a corresponding computer program product.

2. Description of the Related Art

A method for the automatic control of illumination devices, especially of a motor vehicle, using a brightness sensor is described in the published German patent application document DE 101 16 490 A1. The brightness sensor outputs signals, and following a time interval that begins at the instant at which the signals exceed or drop below a first threshold, the illumination devices are switched off. The length of the time interval is variable and can be increased, in particular.

BRIEF SUMMARY OF THE INVENTION

Against this backdrop, the present invention introduces a method for switching on a high beam headlight of a vehicle, a control device for switching on a high beam headlight of a vehicle, and a corresponding computer program product.

The front headlights of a vehicle illumination system can operate in at least two operating states. One of the operating states is generally known as low beam, and another operating state is generally known as high beam. If the illumination system is operated as high beam headlights, the front headlight emits a lot of light and illuminates a driver's visual field across a wide area and at high intensity. If the illumination system is operated in low-beam mode, then the emerging light is heavily directional and illuminates only a small portion of the driver's visual field in front of the vehicle in order not to blind other road users. The switch between high beam and low beam headlights requires a direct control command of a vehicle driver. Since driving at night using low beam headlights is exhausting, and dangers are detectable much later than when driving with high beam headlights, it is advantageous to prolong high beam driving for as long as possible. To do so, however, requires a lot of concentration by the vehicle driver on a continuous basis so that the high beam headlights are switched off and reactivated again at the proper time. Since driving a vehicle at night poses a challenge of its own for many drivers, it is often the case that the switch between high beam and low beam headlights takes place too late or is not made at all, for reasons of comfort or inattention. For one, this exposes other road users to serious glare, with the related negative effect on the other drivers. On the other hand, once the switch to low beam headlights has been made, many vehicle drivers continue to drive using the low beam headlights even after having passed the other driver, although there is no longer any need to do so. As a result, these drivers are "flying blind without instruments", so to speak, and are able to recognize dangers only to a limited extent and too late.

The invention is based on the understanding that once a reason for an operation of the low beam headlights no longer applies, the main headlights of a vehicle can be switched from low beam to high beam in automatic manner after the vehicle has traveled a predefined distance. This makes it possible, based on the covered distance, to determine a point at which the high beam headlight is advantageously reactivated. Since an oncoming vehicle is able to be detected by localizing its main headlights during darkness, a direct activation of the high beam headlights when the main headlights of the oncoming vehicle are at the level of the own vehicle could mean that a driver of the oncoming vehicle is still in a glare zone of the own headlights and would be dazzled. This can be avoided by waiting for the duration of the predefined distance. If multiple oncoming vehicles are located in the glare zone simultaneously, then the high beam headlight is activated only when no vehicle is located in the glare zone any longer.

The present invention provides a method for activating high beam headlights of a vehicle, the method comprising the following steps:

Receiving high-beam information via an interface, the high-beam information indicating a possibility for dazzle-free operation of the high beam headlights;

Determining a travel distance covered by the vehicle, in response to receiving the high-beam information; and Providing switch-on information for switching on the high beam headlights if the covered travel distance after receiving the high-beam information is greater than a predefined minimum distance.

High beam is an operating type of a vehicle headlight that has a greater horizontal and vertical illumination angle than low beam. The high beam is able to illuminate a wide area in the visual field in front of a vehicle driver. Other road users may be dazzled and thus hampered or endangered if the high beam is aimed at them directly. High-beam information may be provided by an environment-detection device and represent a situation in which the high beam headlights may be operated without interfering with other road users or without exposing them to glare. For example, the high-beam information may be provided when no other road users are located within a detection region of the environment-detection device. The high-beam information may also represent a situation in which the detection device does not detect any other road users who could be exposed to glare. A covered travel distance may represent a distance the vehicle has traveled between two route points. For example, the covered travel distance may be determined from a number of wheel rotations and a rolling diameter of the wheel. The covered travel distance is also able to be determined by calculation from a current speed. A predefined minimum distance may denote a safety distance between a route point at which the high-beam information was received and a route point at which the high beam headlight is activated. The safety distance may be large enough so that the high beam is activated only after an oncoming vehicle is expected to have passed the vehicle headlights of the own vehicle completely. The predefined minimum distance may be variable. The method may include a step of determining the minimum distance for this purpose. The switch-on information can be output to the vehicle headlight via an interface and be appropriate for activating an illumination means of the headlight.

In the supply step according to one further specific development of the present invention, the switch-on information may be supplied if the high-beam information remains in force without interruption after receiving the high-beam information while driving the predefined minimum distance. As soon as a road user is detected while traveling the minimum distance, the high-beam information may be reset, or low-beam information may be supplied. This prevents the supply of the switch-on information.

In the step of providing the predefined minimum distance while taking a road class on which the vehicle is located into account, it is additionally or alternatively possible to determine a road form in a region in which the vehicle is located. A road class is a road category that is able to be assigned to the road when different characteristics are taken into account. It is possible, for example, to classify roads according to function, location and environment. For instance, a road may be classified as connecting road within a city with established housing. Or, for example, as access road within city limits with houses, or as connecting road outside city limits without established housing. It is moreover possible, for example, to subdivide connecting roads even further. Pertinent examples could be expressways, interstate roads, rural roads or municipal roads. Depending on the road class, different factors may be taken into account in assigning the minimum distance. For example, the minimum distance on an expressway may be shorter than on a federal highway. On a built-up municipal road with street lights, the output of the switch-on information may be prevented until the vehicle has left a street light region. A street form may describe hilliness or an altitude profile, and curviness or a curve profile of the road. For instance, a road may feature elevations and/or curves which restrict a maximum visual range and thus a detection range for detecting other road users. In this case, the minimum distance may be extended in comparison with a straight road characteristic. In the same way the road elevations and/or curves could restrict an effective range of the high beam headlights. This makes it possible, for example, to activate the high beam headlights despite the fact that the environment-detection device has already detected another road user, who, however, is not located within a glare region of the high beam headlights.

In the supply step according to a further specific development of the present invention, the predefined minimum distance may also be determined while taking a current driving state of the vehicle into account, in addition or as an alternative to information relating to a current traffic situation. A current driving state may mean a current speed of the vehicle, a current yaw rate, a current brightness of the environment, a current time or a current system state. Suitable sensors may provide information about the current driving state. At high speed, for instance, a shorter minimum distance may be defined than at low speed. In the same way, a lower minimum distance may be defined at a low yaw rate than at a high yaw rate. When the brightness of the environment is high, it is possible to define a greater minimum distance than in the case of low brightness of the environment. A current system state may affect the minimum distance insofar as in an error in the environment-detection device or the object detection, for instance, a high standard value may be used for the minimum distance, which may offer additional safety with regard to exposing other road users to glare. A current traffic situation may mean information about one or more vehicle(s) in the environment of the vehicle. The information may also be received from sources that are independent of the vehicle. The traffic situation information could also be made available by the environment-detection device and, for example, represent information about the location, speed and movement direction of at least one other vehicle. The information is also able to be accumulated over a past time interval by the environment-detection device. A time window of a few minutes or seconds, in particular, may be taken into account in this context. For example, based on high traffic density on an oncoming lane, a great likelihood of additional vehicles on the oncoming lane may be inferred and the minimum distance therefore set higher. In the case of an overtaking vehicle, the minimum distance may additionally be influenced based on a speed differential. In this way, for example, a shorter distance may be defined if a high speed differential is determined, and a longer minimum distance if a lower speed differential is ascertained.

In one further specific embodiment which includes a step of determining an expected switch-off instant for switching off the high beam headlights, the switch-on information for switching on the high beam headlights may be provided in the supply step, if a predefined minimum switch-on period for the high beam headlights lies between an instant at which the switch-on information is supplied and the expected switch-off instant. A minimum switch-on period may be a targeted minimum illumination period for the high beam headlights. This makes it possible to avoid an unnaturally frequent switch between high beam and low beam and to achieve a long service life for the headlights. For instance, an oncoming vehicle may already have been detected, but not be located in a glare zone of the high beam headlights yet. If it appears like that a time period until the high beam headlight is switched off again will be shorter than the minimum switch-on period, the output of the switch-on information may be suppressed. This avoids the transmission of false information for the driver of the oncoming vehicle, since a very short use of the high beam generally is taken as a warning signal, a special signal or an attention-seeking signal.

In the supply step in one additional specific development of the present invention, the predefined minimum distance may be adapted taking at least one stored characteristic curve into account, the characteristic curve representing a relationship between the minimum distance and a currently ascertained parameter. Values of the characteristic curve are storable in the form of a reference table. The characteristic curve may represent a relationship between the two variables that was determined in advance. The relationship may be non-linear. One of the variables may be the minimum distance, an increase or decrease in the minimum distance, or a factor for an increase or decrease in the minimum distance. Increases and decreases, as well as factors of different characteristic curves may accumulate, and negative values or factors may reduce the minimum distance. A currently determined parameter may refer to a value that is provided by a corresponding vehicle sensor. In the same way, a currently determined parameter may be a value determined from multiple parameters. For example, a current speed of the vehicle, a current yaw rate of the vehicle, a brightness of an environment, a maximum visual range in front of the vehicle, a current time of day or a current traffic density may be the current parameter. This makes it possible to include also complicated non-linear relationships between the minimum distance and various factors in the determination of the minimum distance in a reliable and simple manner.

Furthermore, according to another specific embodiment, the predetermined minimum distance may be determined in the supply step using an empirical high-beam activation model having at least two input variables. An empirical high-beam activation model may be understood as a simplified image, based on past drives, for simulating the high-beam activation and deactivation. Parameters of the models may be estimated or measured or be based on stored observations. When analyzing the model, fuzzy quantity limits of the factors may be taken into account and fuzzy results be averaged by geometrical analysis, for example. The empirical high-beam activation model may include as one parameter the minimum distance and optimize its parameters in repeat loops. This makes it possible to consider complex relationships of multiple factors to determine the minimum distance.

In addition, the present invention also includes a control device for switching on the high beam headlights of a vehicle, having the following features:

a device for receiving high-beam information via an interface, the high-beam information indicating a possibility for glare-free operation of the high beam;

a device for determining a traveled distance of the vehicle, which is ascertained in response to the reception of high-beam activation information; and a device for providing switch-on information for switching on the high beam headlights if the covered travel distance after receiving the high-beam information is greater than a predefined minimum distance. The object on which the present invention is based is also able to be achieved quickly and efficiently by this particular embodiment variant of the present invention in the form of a control device.

In the case at hand, a control device is an electrical device which processes sensor signals and outputs control signals as a function thereof. The control device may have an interface, which may be developed as hardware and/or software. In a hardware development, the interfaces, for example, may be part of a so-called system ASIC, which includes all kinds of functions of the control device. However, it is also possible for the interfaces to represent discrete, integrated switching circuits on their own or to be at least partially made up of discrete components. In a software development, the interfaces may be software modules which are present on a microcontroller, in addition to other software modules, for example.

Advantageous is also a computer program product having program code that may be stored on a machine-readable carrier such as a semiconductor memory, a hard-disk memory or an optical memory, which is used to implement the method according to one of the specific embodiments described above when the program is executed on a device that corresponds to a computer.

DETAILED DESCRIPTION OF THE INVENTION

Figure 1:
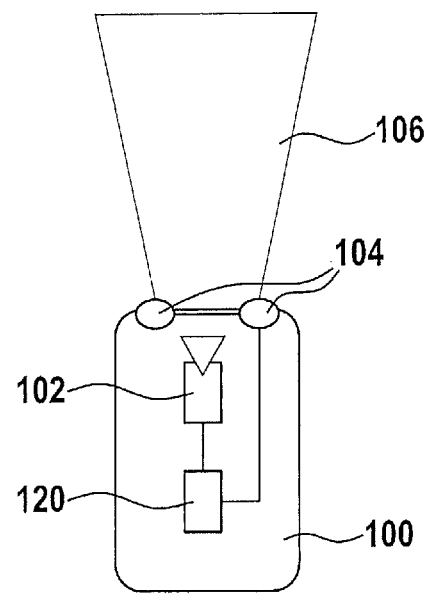
FIG. 1 shows an illustration of a vehicle according to an exemplary embodiment of the present invention.

In the subsequent description of preferred exemplary embodiments of the present invention, the same or similar reference numerals are used for the elements that are shown in the various figures and act similarly, so that a repeated description of these elements has been dispensed with.

FIG. 1 shows an illustration of a vehicle 100 according to an exemplary embodiment of the present invention. Vehicle 100 has an environment-detection device 102, headlights 104 featuring low beam and high beam, as well as a control device 120 for switching on the high beam headlights. Environment-detection device 102 in this exemplary embodiment is a camera 102 with integrated object detection. The environment-detection device could just as well be a radar device, for example. The object detection is set up to detect other road users. It is furthermore designed to provide high-beam information if camera 102 does not detect any other road users in front of vehicle 100 in a glare zone 106 in front of vehicle 100. In such a case other road users are unable to be blinded by headlights 104.

Figure 2:
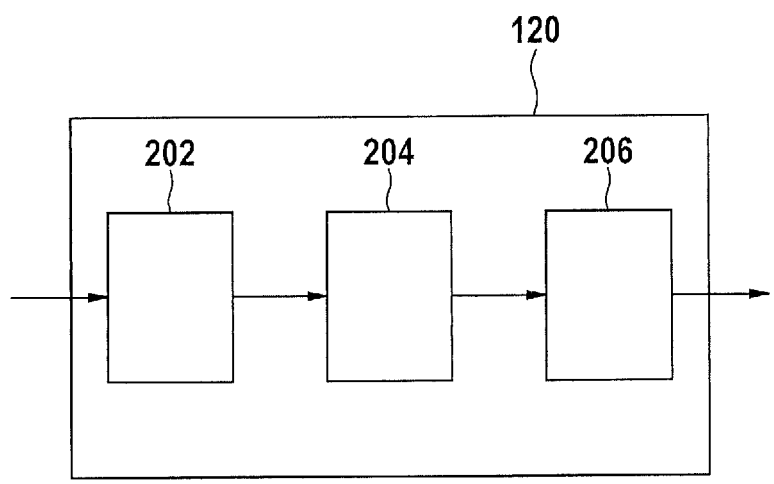
FIG. 2 shows a block circuit diagram of a control device according to an exemplary embodiment of the present invention.

FIG. 2 shows a block circuit diagram of a control device 120 according to one exemplary embodiment of the present invention. Control device 120 may be control device 120 shown in FIG. 1 and be used for switching on the high beam headlights of vehicle 100. It is designed to receive high-beam information and to determine and output switch-on information on that basis. Control device 120 includes a device 202 for receiving high-beam information, a device 204 for determining a traveled distance, and a device 206 for supplying switch-on information. Device 202 is developed to receive the high-beam information from an environment-detection device by way of an interface. The environment-detection device is designed to detect a vehicle environment, especially an environment in front of the vehicle, and to detect other road users therein. The high-beam information indicates a possibility of operating the high beam headlights without the risk of blinding other road users. Device 204 ascertains the distance traveled by the vehicle since the instant at which the high-beam information was received. If the traveled distance is greater than a predefined minimum distance, device 206 provides the switch-on information for activating the high beam headlights. In response to the switch-on information, the high beam headlights of the vehicle can be turned on.

Figure 3:
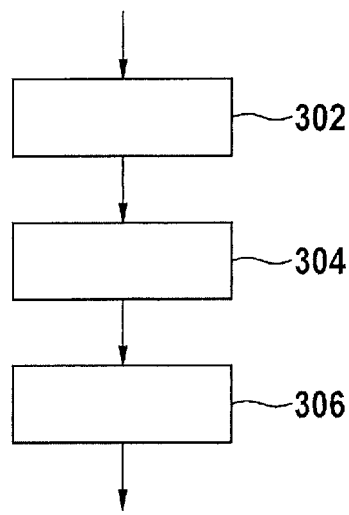
FIG. 3 shows a flow chart of a method for switching on a high beam headlight of a vehicle according to an exemplary embodiment of the present invention.

FIG. 3 shows a flow chart of a method for switching on the high beam headlights of a vehicle according to one exemplary embodiment of the present invention. The method includes a receiving step 302, a determination step 304, and a supply step 306. The method is able to be executed by the control device shown in FIG. 2. The initial state of the method is a deactivated high beam headlight. After an environment-detection device 102 (shown by way of example in FIG. 1) of vehicle 100 has detected that no other road user will be blinded by a switch to the high beam headlights, the environment-detection device outputs high-beam information. The high-beam information is read in via an interface in receiving step 302. Starting with the reading in of the high-beam information, a distance that the vehicle is traveling is determined in determination step 304. If the traveled distance is greater than a predefined minimum distance, the switch-on information for activating the high beam headlights is output in supply step 306. In this way it can be excluded, for example, that an oncoming vehicle will be exposed to glare because the vehicle continues to travel the minimum distance beyond the point at which the oncoming vehicle has left the detection range of the environment-detection device. Waiting out the minimum distance furthermore introduces damping in a headlight control, which reduces a constant activation and deactivation of the high beam headlights. If multiple road users are trailing each other, especially vehicles that travel toward the own vehicle, it is thus possible to avoid a brief high-beam activation between the vehicles. The minimum distance may be enlarged or reduced based on multiple influencing factors. At high speed, for instance, the minimum distance can be shortened since it may be assumed that an oncoming vehicle is likewise traveling at high speed and will therefore exit a glare zone in which a driver of the oncoming vehicle may be exposed to glare more rapidly.

According to one exemplary embodiment, the information processing takes the traffic situation or traffic density into account in an actuation of illumination systems. In the case of an illumination system that adapts the light distribution to the current traffic situation, the speed of the switchover from one light distribution to another may be selected on the basis of multiple input variables. This leads to a comfortable behavior for the driver and simultaneously to the best possible illumination of the road. A debouncing time in a high beam activation function that realizes an automatic switch between high beam and low beam headlight should be selected so that, for one, the driver obtains optimal illumination in front of the vehicle and, for another, no "jittery" behavior of the headlights comes about. Currently, it is known to use multiple debouncing times. However, these debouncing times are considered to be fixed and configured according to the state of the passing vehicle. In the system introduced here, individual traffic situations are detected and the appropriate debouncing time selected.

In the following text, it will be illustrated how a debouncing time for a high-beam assistant for the switch between low beam and high beam headlights in the HMA function (High BeaM Assist) is determined. In a camera, multiple traffic situations such as expressway, traffic ahead, oncoming traffic or excessively short driving using high beam headlights are classified with the aid of the information of the camera. Then, a characteristic curve, in which the speed is plotted over the debouncing time, for example, is determined for each mentioned situation. These characteristic curves are now able to be applied or used accordingly, so that a vehicle-specific behavior may be obtained. In this context it is advantageous to select a short debouncing time at high speed, in order to minimize driving with the low beam headlights in the presence of a passing vehicle, and to obtain an optimum illumination in this manner. The situation "excessively short driving using the high beam headlights" describes the case in which a convoy of vehicles passes the own vehicle, and the high beam headlight is activated very briefly in front of the second vehicle while the first vehicle is passing or has passed the first vehicle. In addition to the already mentioned situations, additional situations may be detected and a separate corresponding characteristic curve be selected for the debouncing. For example, a yaw rate, an average yaw rate over the final x meters, navigation data relating to the further course of the road, a length of the detection of another vehicle, i.e., a length of the track, or a behavior of the track within the image may be used. High dynamics may suggest a changeable road characteristic and thus a high likelihood of the sudden appearance of an oncoming vehicle.

According to one exemplary embodiment, the debouncing time for a high-beam assistant of a vehicle is determined with the aid of the method shown in FIG. 3. A DPC camera (Dual Purpose Camera) for light and lane algorithms, or an MPC camera (Multi-Purpose Camera) for all functions on the camera are used to detect objects at night. The objects could be other road users and/or infrastructure objects. Provided no other vehicle will be exposed to glare, an automatic control of the headlights then automatically switches to high beam headlights. In order to avoid jittery behavior of the headlights, a particular period of time, which is defined via a minimum distance in this case, has to elapse before a switch to high beam takes place, once no further car is detected in the image. Thus, it is waited for the duration of a debouncing or waiting period. In the conventional approaches, this debouncing time is selected only as a function of the own vehicle parameters or as a function of the detected object parameters. The various wait times are started and a switch to high beam headlights takes place again only when at least one of the wait times has elapsed. According to the approach introduced here, no waiting time but a wait distance is assumed. As a result, an implicit dependency on the speed comes about. This has the advantage that the driving distance which is traveled using the low beam headlights when no other vehicle is within the visual range of the camera is predefined. In addition, a characteristics curve may be used to establish a connection between the speed and the debouncing time. It is also possible that different situations lead to different debouncing times, which in turn may be combined with the aid of the fuzzy logic. The debouncing distance may be selected as a function of the road type, e.g., city or expressway; it may be selected as a function of the current time, as a function of the number of passed cars driving in convoy form; it may be selected as a function of the altitude profile of the roadway and/or the curve profile of the roadway; it may be selected as a function of the distance that has been traveled previously using the high beam headlights, or a profile predefined by the driver. Furthermore, using a connection to a corresponding server, the current traffic flow on the traveled road is able to be determined, since the likelihood of a further appearance of vehicles increases as a result. In the approach introduced here, the waiting period until the switch to high beam headlights occurs depends on multiple independent factors, and the factors are combined into a common debouncing time with the aid of the fuzzy logic. For example, these factors may be the speed of the vehicle, the yaw rate of the vehicle, the number of vehicles that has passed the vehicle using the low beam headlights, the average time or average distance between the last change from low beam to high beam headlights, the distance covered since the last street light, the hilliness or the curviness of the route, the ambient brightness, the visual range of the camera. If a navigation system is available, then the time of day or the proximity to an urban area may suggest high traffic volume, and the time be extended accordingly. In addition, data regarding the current traffic flow on the route, the time and the reliability at which a detected object was tracked, or a length of the track and the road type, such as expressway or city, may be used.

The debouncing time is determined via a situation analysis. An individual characteristic curve which relates the resulting debouncing time to the speed or other factors may be stored for the corresponding various situations. In addition, it is possible to combine the various debouncing times for different situations.

Figure 4:
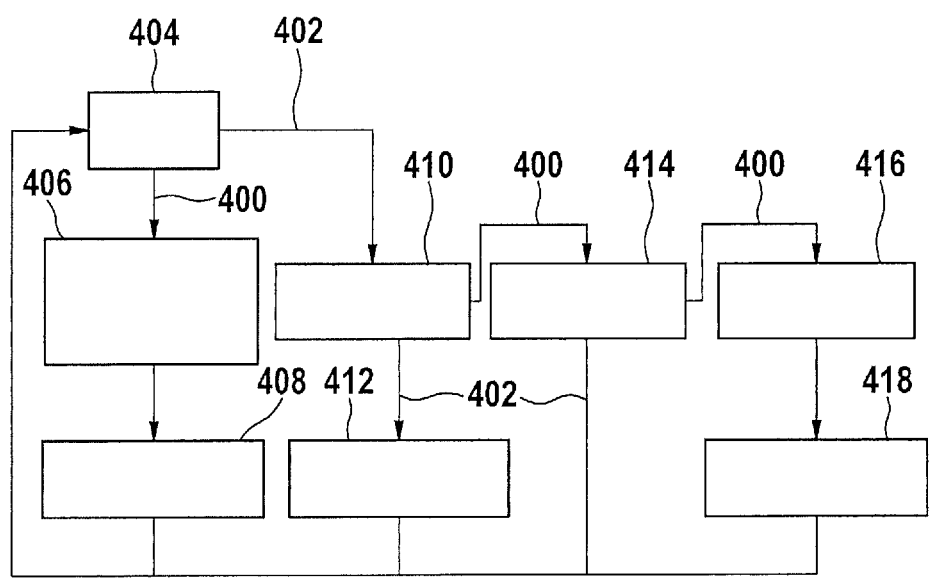
FIG. 4 shows a schematic block diagram of a method for switching on a high beam headlight of a vehicle according to another exemplary embodiment of the present invention.

FIG. 4 shows a schematic block diagram of a method for switching on the high beam headlights of a vehicle according to one further exemplary embodiment of the present invention. The method may be executed by control device 120 shown in FIG. 2. Shown is a decision and action tree having a plurality of YES branches 400 and NO branches 402, and a plurality of steps 404, 406, 408, 410, 412, 414, 416, 418. A first query 404 "Vehicle detected?" is followed by an action 406 "Analyze parameters of the vehicle" if a vehicle was detected. After the parameters of the vehicle have been analyzed, a further action 408 "Determining the debouncing time" follows, in which the parameters are considered. The debouncing time is defined via a minimum distance. Once the debouncing time has been determined, query 404 "Vehicle detected?" takes place again. If no vehicle is detected, query 410 "Has debouncing time started?" follows. If the debouncing time has not been started, an action 412 "Start debouncing time" occurs in which the debouncing time is started. The debouncing time determined in action 408 "Determine debouncing time" is employed in action 412 "Start debouncing time". If the debouncing time has started, query 404 "Vehicle detected?" is carried out again. If the answer to query 410 "Has debouncing time started?" is yes, then another query 414 is implemented "Has debouncing time elapsed?"; if the debouncing time has not elapsed, another query 404 "Vehicle detected" takes place. If the debouncing time in query 414 has elapsed, an action 416 "Switch to high beam" occurs, in which the high beam headlight is activated. Then a further action 418 "Start high beam timer" may take place, in which a high beam timer is activated. If the high beam headlight is activated, another query 404 "Vehicle detected?" takes place again. If a vehicle is detected, then the high beam headlight is deactivated.

Figure 5A:
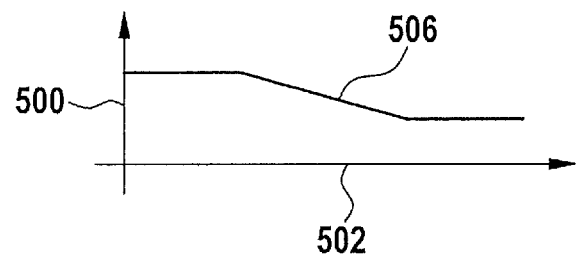
FIG. 5a shows a diagram of a differential-speed characteristic curve for influencing a minimum distance according to an exemplary embodiment of the present invention.
Figure 5B:
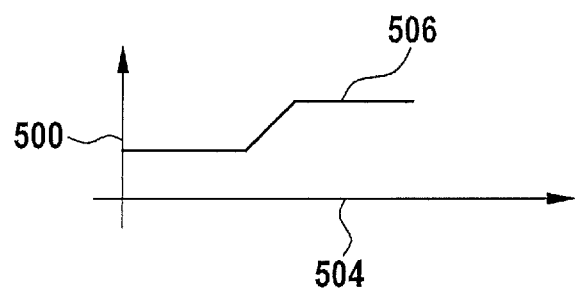
FIG. 5b shows a diagram of a yaw-rate characteristic curve for influencing a minimum distance according to an exemplary embodiment of the present invention.

FIGS. 5a and 5b show a diagram of a characteristic curve for influencing a minimum distance according to one exemplary embodiment of the present invention. A value s 500, which represents minimum distance 500 or a factor for the minimum distance, has been plotted on the ordinate in the diagrams. A differential speed 502 in km/h is plotted on the abscissa in FIG. 5a relative to a detected vehicle. A yaw rate 504 in rad/s has been plotted on the abscissa in FIG. 5b.

FIG. 5a shows a differential speed characteristic curve 506 for the disappearance of vehicles driving ahead. At a low differential speed 502, minimum distance s 500 has a high value. The high value remains constant until a differential-speed threshold value has been reached. Then, with rising differential speed 502, characteristic curve 506 drops to a low value at a constant gradient. Starting from another, higher differential-speed threshold value, minimum distance 500 remains constant at the low value. As a result, minimum distance 500 varies between a maximum value and a minimum value, minimum distance 500 becoming progressively smaller within a differential-speed range with increasing differential speed 502.

FIG. 5b shows a yaw rate characteristic curve 506. At a low differential yaw rate 504, minimum distance s 500 has a low value. The low value remains constant up to a yaw-rate threshold value. Then, as yaw rate 504 rises, characteristic curve 506 increases to a high value at a constant gradient. Starting from another, higher yaw-rate threshold value, minimum distance 500 remains constant at the high value. As a result, minimum distance 500 varies between a minimum value and a maximum value, and minimum distance 500 increases progressively within a yaw-rate range the greater yaw rate 504 becomes.

Figure 6:
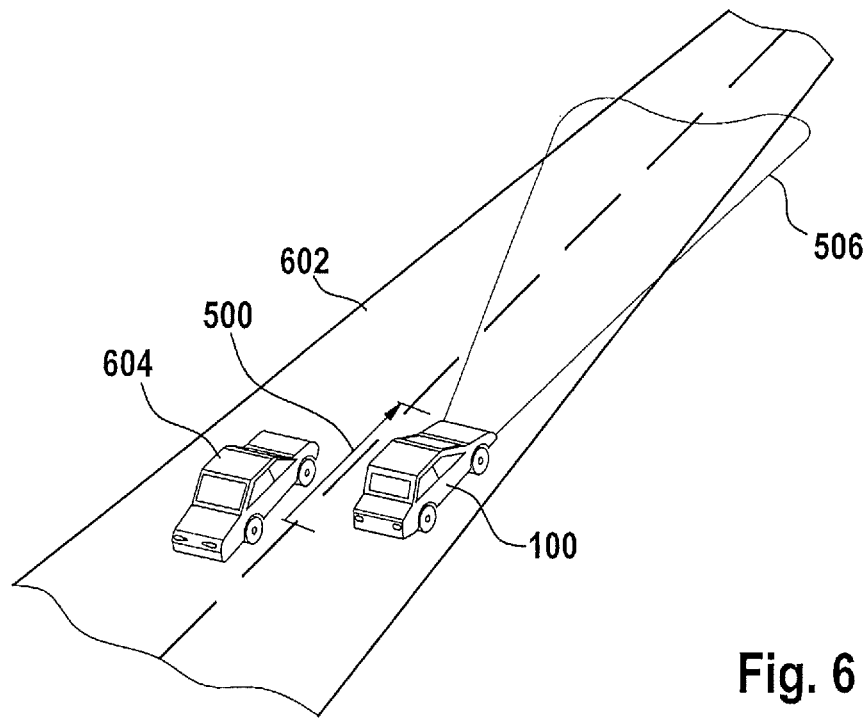
FIG. 6 shows an illustration of a driving situation according to an exemplary embodiment of the present invention.

FIG. 6 shows a view of a driving situation in which the high beam headlight of a vehicle 100 is activated after vehicle 100 has traveled a minimum distance 500 according to one exemplary embodiment of the present invention. A road 602 is shown which has a single directional lane in each case. Directional lanes are separated by a broken-line center marking. A vehicle 100 is passed by an oncoming vehicle 604. It is dark, and vehicle 100 is driving with its lights on. A glare zone 506 is illustrated in front of vehicle 100. As long as vehicle 604 is located within glare zone 506 of vehicle 100, the headlights of vehicle 100 were on the low beam setting. Glare zone 506 is congruent with a headlight cone of the high beam headlights in front of vehicle 100 in this simplified example. When oncoming vehicle 604 has left the glare zone, the control device of vehicle 100 begins to determine a covered distance 500 of vehicle 100 for an activation of the high beam headlights in vehicle 100. As soon as determined distance 500 is greater than a predefined minimum distance, the control device supplies switch-on information, and the high beam headlight is activated. While vehicle 100 travels the minimum distance, oncoming vehicle 604 is likewise traveling a certain distance.

Figure 7:
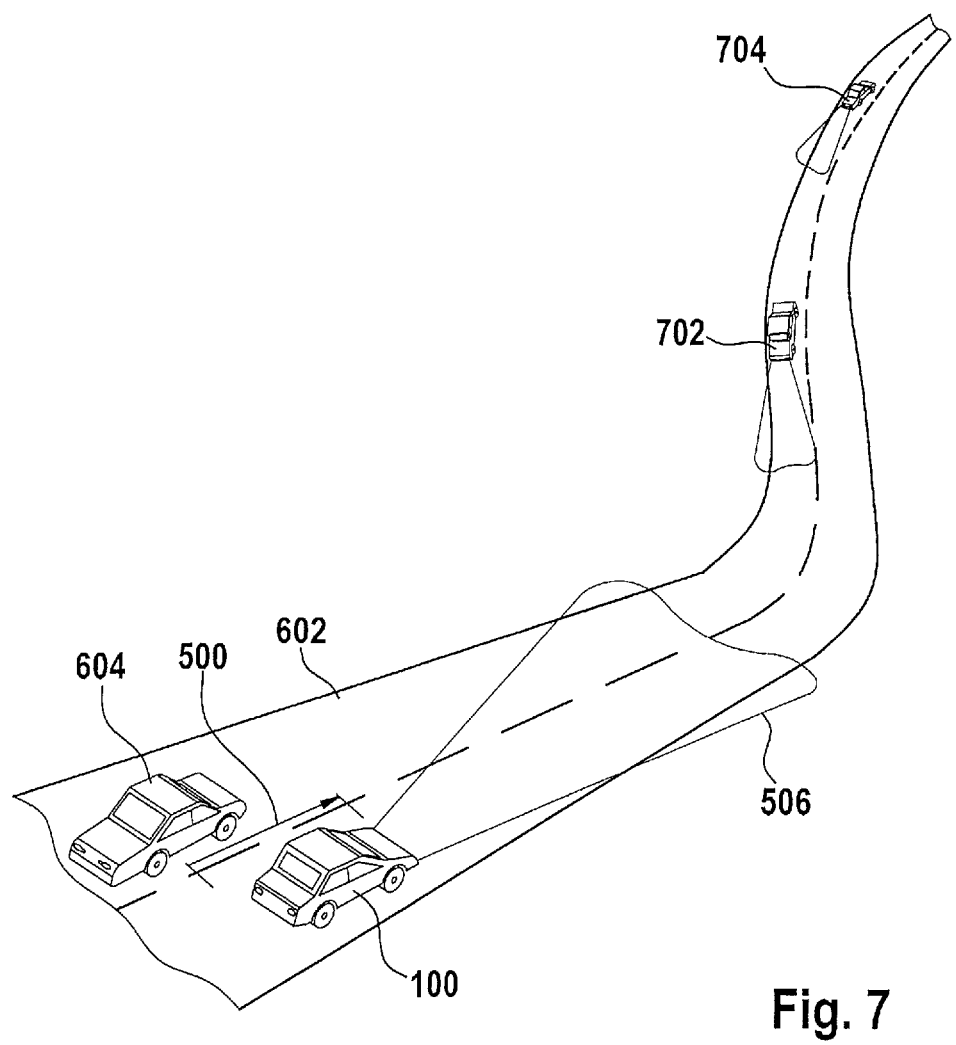
FIG. 7 shows an illustration of another driving situation according to an exemplary embodiment of the present invention.

FIG. 7 shows a view of another driving situation in which the high beam headlights of a vehicle 100 are activated according to one exemplary embodiment of the present invention. As in FIG. 6, vehicle 100 has been passed by an oncoming vehicle 604 on road 602. No other road user is located within glare zone 506. Vehicle 100 has covered minimum distance 500, which is why the high beam headlight has been activated by the control device in order to switch on the high beam headlight. Two further vehicles 702, 704, which have already been detected by the environment-detection device of vehicle 100, are driving toward vehicle 100. A previously calculated time interval will elapse before the first of vehicles 702, 704 will enter glare zone 506 of vehicle 100. According to this exemplary embodiment, the time interval calculated in advance is greater than a predefined minimum switch-on period for the high beam headlights. As a result, the high beam headlight is switched on despite the fact that oncoming vehicles 702, 704 have been detected. The high beam headlight will be deactivated when first oncoming vehicle 702 enters glare zone 506.

Figure 8:
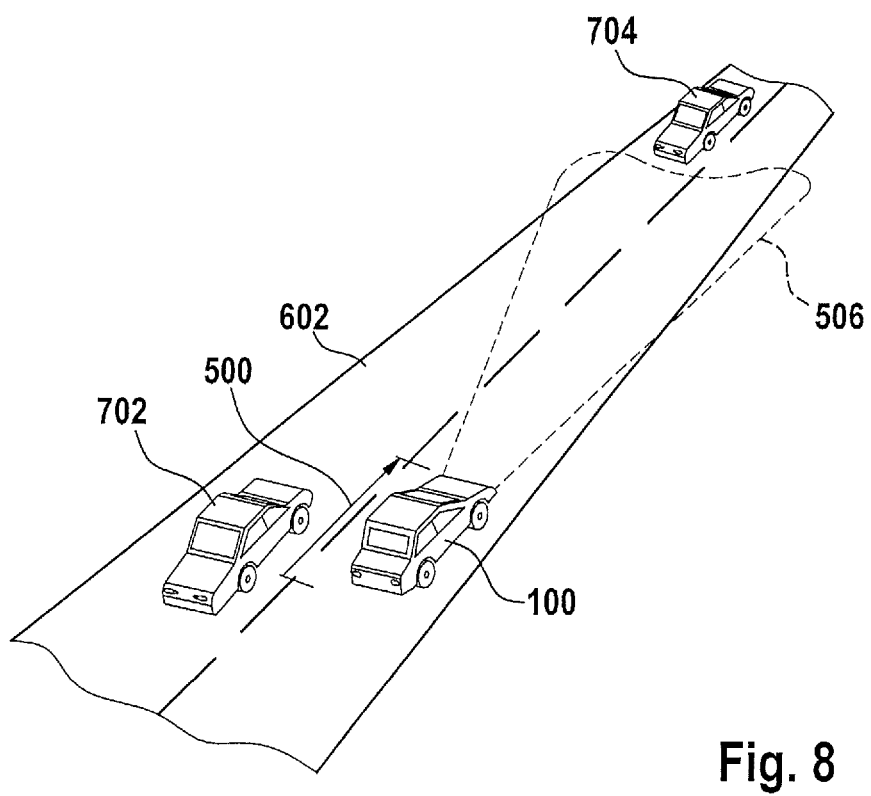
FIG. 8 shows an illustration of a further driving situation according to an exemplary embodiment of the present invention.

FIG. 8 shows a view of a driving situation in which the high beam headlights of a vehicle 100 are not activated after vehicle 100 has traveled a minimum distance 500 according to an exemplary embodiment of the present invention, because the minimum illumination period until a subsequent deactivation occurs is unable to be reached. Shown is a later instant than in FIG. 7. The two oncoming vehicles 702, 704 have reached vehicle 100 and vehicle 702 has already passed vehicle 100. Vehicle 100 has traveled minimum distance 500, and no road user is located within glare zone 506. Nevertheless, the high beam headlight is not activated. In the control device it is detected that an achievable illumination period for the high beam headlight will be shorter than a minimum illumination period, because vehicle 704 is on the verge of entering glare zone 506. This is the reason for not activating the high beam headlight. In this way the driver of vehicle 704 will not be exposed to a brief activation of the headlight. A brief activation of the high beam headlight may be perceived as a light signal, such as flashing of one's lights, and could be misinterpreted.

The exemplary embodiments described and shown in the figures have been selected merely as examples. Different exemplary embodiments are combinable with one another, either completely or with regard to individual features. An exemplary embodiment may also be supplemented by features from another exemplary embodiment.

In addition, steps of the method of the present invention may be repeated or executed in a sequence other than the one described.

If an exemplary embodiment includes an "and/or" linkage between a first feature and a second feature, this may be understood to mean that the exemplary embodiment according to one specific embodiment has both the first feature and the second feature, and according to an additional specific embodiment, either has only the first feature or only the second feature.

What is claimed is:

1. A method for switching on a high beam headlight of a vehicle, comprising:
   receiving, via an interface, high-beam information indicating a possibility of a glare-free operation of the high beam headlight;
   determining a traveled route distance of the vehicle traveled after receiving the high-beam information; and
   supplying switch-on information for switching on the high beam headlight if the traveled route distance of the vehicle traveled after receiving the high-beam information is greater than a predefined minimum distance, wherein the predefined minimum distance varies as a function of at least one of (i) a road class on which the vehicle is located, (ii) a road form in a region in which the vehicle is located and (iii) information about a current traffic situation.

2. The method as recited in claim 1, wherein the switch-on information for switching on the high beam headlight is supplied if the high-beam information is present without interruption while traveling the predefined minimum distance after receiving the high-beam information.

3. The method as recited in claim 2, further comprising:
   determining an expected switch-off instant for switching off the high beam headlight;
   wherein the switch-on information for switching on the high beam headlight is supplied if a predefined minimum switch-on period for the high beam headlight lies between an instant at which the switch-on information is supplied and the expected switch-off instant.

4. The method as recited in claim 2, wherein the predefined minimum distance is adapted by taking into account at least one stored characteristics curve representing a relationship between the minimum distance and a currently ascertained vehicle dynamics parameter.

5. The method as recited in claim 2, wherein the predefined minimum distance is determined using an empirical high-beam activation model having at least two input variables.

6. The method as recited in claim 1, wherein the information about a current traffic situation includes information representing at least one of a location, speed and movement direction of at least one other vehicle in an environment of the vehicle.

7. A control device for switching on a high beam headlight of a vehicle, comprising:
   a device for receiving high-beam information via an interface, the high-beam information indicating a possibility of a glare-free operation of the high beam headlight;
   a device for determining a traveled route distance of the vehicle traveled after receiving the high-beam information; and
   a device for supplying switch-on information for switching on the high beam headlight if the traveled route distance of the vehicle traveled after receiving the high-beam information is greater than a predefined minimum distance, wherein the predefined minimum distance varies as a function of at least one of (i) a road class on which the vehicle is located, (ii) a road form in a region in which the vehicle is located and (iii) information about a current traffic situation.

8. The control device as recited in claim 7, wherein the information about a current traffic situation includes information representing at least one of a location, speed and movement direction of at least one other vehicle in an environment of the vehicle.

9. A non-transitory computer-readable data storage medium storing a computer program having program codes which, when executed on a computer, implements a method for switching on a high beam headlight of a vehicle, the method comprising:
   receiving, via an interface, high-beam information indicating a possibility of a glare-free operation of the high beam headlight;
   determining a traveled route distance of the vehicle traveled after receiving the high-beam information; and
   supplying switch-on information for switching on the high beam headlight if the traveled route distance of the vehicle traveled after receiving the high-beam information is greater than a predefined minimum distance, wherein the predefined minimum distance varies as a function of at least one of (i) a road class on which the vehicle is located, (ii) a road form in a region in which the vehicle is located and (iii) information about a current traffic situation.

10. The medium as recited in claim 9, wherein the information about a current traffic situation includes information representing at least one of a location, speed and movement direction of at least one other vehicle in an environment of the vehicle.

* * * * *